(12) United States Patent
Matsumura et al.

(10) Patent No.: US 12,328,274 B2
(45) Date of Patent: Jun. 10, 2025

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Jing Wang, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 709 days.

(21) Appl. No.: 17/616,334

(22) PCT Filed: Jun. 6, 2019

(86) PCT No.: PCT/JP2019/022648
§ 371 (c)(1),
(2) Date: Dec. 3, 2021

(87) PCT Pub. No.: WO2020/246014
PCT Pub. Date: Dec. 10, 2020

(65) Prior Publication Data
US 2022/0231810 A1 Jul. 21, 2022

(51) Int. Cl.
*H04L 5/00* (2006.01)
*H04W 72/23* (2023.01)

(52) U.S. Cl.
CPC .......... *H04L 5/0048* (2013.01); *H04L 5/0035* (2013.01); *H04W 72/23* (2023.01)

(58) Field of Classification Search
CPC ................................ H04L 5/00; H04W 72/00
See application file for complete search history.

(56) References Cited

U.S. PATENT DOCUMENTS

| 2020/0170036 A1 | 5/2020 | Akoum et al. |
| 2020/0187171 A1* | 6/2020 | Hwang ................. H04W 72/23 |
| 2021/0242922 A1* | 8/2021 | Koskela ................ H04W 72/23 |

FOREIGN PATENT DOCUMENTS

WO 2019-032497 A1 2/2019

OTHER PUBLICATIONS

Nokia, Nokia Shanghai Bell, "Failure Detection Resources for BFR", 3GPP TSG RAN WG1 #98, Athens, Greece, Feb. 25-Mar. 1, 2019, R1-1902561 (Year: 2019).*
Office Action issued in Japanese Application No. 2021-524630 dated Mar. 22, 2023 (8 pages).
International Search Report issued in PCT/JP2019/022648 on Jul. 9, 2019 (2 pages).
Written Opinion of the International Searching Authority issued PCT/JP2019/022648 on Jul. 9, 2019 (4 pages).
(Continued)

*Primary Examiner* — Siming Liu
(74) *Attorney, Agent, or Firm* — Osha Bergman Watanabe & Burton LLP

(57) ABSTRACT

A terminal according to one aspect of the present disclosure includes: a control section that, when a reference signal for beam failure detection (BFD-RS) is not configured for the terminal, determines a reference signal of a transmission configuration indication (TCI) state associated with at least one transmission/reception point (TRP) as the BFD-RS; and a receiving section that receives the BFD-RS. According to one aspect of the present disclosure, link failure can be appropriately detected.

3 Claims, 12 Drawing Sheets

(56) References Cited

OTHER PUBLICATIONS

Nokia, Nokia Shanghai Bell; "Failure Detection Resources for BFR"; 3GPP TSG RAN WG1 #96, R1-1902561; Athens, Greece; Feb. 25-Mar. 1, 2019 (4 pages).
Sony; "Considerations on Multi-TRP/Panel Transmission"; 3GPP TSG RAN WG1 Meeting #96, R1-1902183; Athens, Greece; Feb. 25-Mar. 1, 2019 (6 pages).
CATT; "Consideration on multi-TRP/panel transmission"; 3GPP TSG RAN WG1 Ad-Hoc Meeting 1901, R1-1901296; Taipei; Jan. 21-25, 2019 (14 pages).
3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

\* cited by examiner

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

In existing LTE systems (for example, 3GPP Rel. 8 to Rel. 14), a user terminal (User Equipment (UE)) transmits uplink control information (UCI) by using at least one of a UL data channel (for example, a Physical Uplink Shared Channel (PUSCH)) and a UL control channel (for example, a Physical Uplink Control Channel (PUCCH)).

In the existing LTE systems (LTE Rel. 8 to Rel. 14), monitoring of radio link quality (RLM) is performed. When a radio link failure (RLF) is detected based on RLM, the user terminal (User Equipment (UE)) is required to re-establish Radio Resource Control (RRC) connection.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

Also for future radio communication systems (for example, NR), the use of radio link monitoring (RLM) has been under study. In NR, a base station may configure a radio link monitoring reference signal (Radio Link Monitoring RS (RLM-RS)) for the UE for each BWP by using higher layer signaling.

In the future radio communication systems (for example, NR), performing a procedure of detecting a beam failure and switching to another beam (which may be referred to as a beam failure recovery (BFR) procedure, BFR, or the like) has been under study.

For BFR, the UE detects a beam failure by using configured reference signal resources. At the same time, in NR at present, the following scheme has been under study: when the resources are not configured, the UE uses up to two reference signal indexes corresponding to transmission configuration indication (TCI) states (TCI-states) of control resource sets (CORESETs) as a set of indexes corresponding to the resources (Beam Failure Detection (BFD)-RSs).

When parameters related to the RLM-RS are not provided, the UE may use the RS provided for an active TCI state for PDCCH reception as the RLM-RS. Here, the UE may determine the RLM-RS, based on a search space set having a minimum monitoring period.

However, when the UE is not provided with parameters related to at least one of the RLM-RS and the BFD-RS, how the UE determines the parameters is not made clear. Unless these are clearly defined, there may be inconsistency on the parameters between the base station and the UE, with the result that performance of RLM may be deteriorated and communication throughput may be deteriorated.

In the light of this, the present disclosure has one object to provide a terminal and a radio communication method capable of appropriately detecting a link failure.

Solution to Problem

A terminal according to one aspect of the present disclosure includes: a control section that, when a reference signal for beam failure detection (BFD-RS) is not configured for the terminal, determines a reference signal of a transmission configuration indication (TCI) state associated with at least one transmission/reception point (TRP) as the BFD-RS; and a receiving section that receives the BFD-RS.

Advantageous Effects of Invention

According to one aspect of the present disclosure, link failure can be appropriately detected.

DESCRIPTION OF EMBODIMENTS (Multiple TRPs)

In NR, a scheme in which one or a plurality of transmission/reception points (TRPs) (multiple TRPs) perform DL transmission to a UE by using one or a plurality of panels (multiple panels) has been under study. A scheme in which the UE performs UL transmission to one or a plurality of TRPs has been under study.

Note that the plurality of TRPs may correspond to the same cell identifier (ID), or may correspond to different cell IDs. The cell ID may be a physical cell ID, or may be a virtual cell ID.

FIGS. 1A to 1D are each a diagram to show an example of a multi-TRP scenario. In these examples, it is assumed that each TRP can transmit four different beams, but this is not restrictive.

Figure 1A:
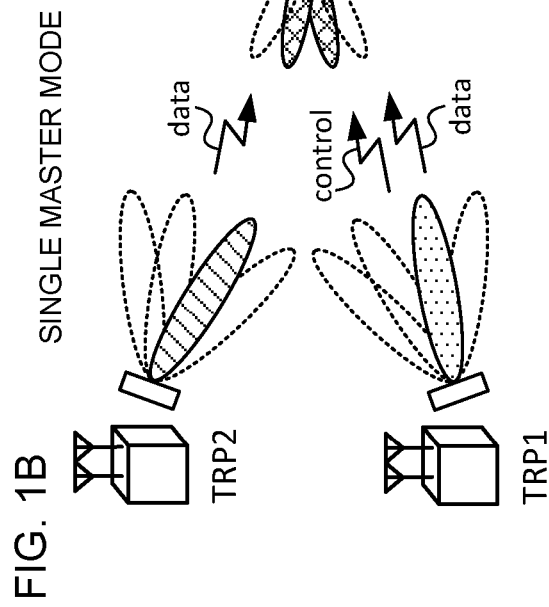
FIGS. 1A to 1D are each a diagram to show an example of a multi-TRP scenario.

FIG. 1A shows an example of a case in which only one TRP (in the present example, TRP 1) out of the multiple TRPs performs transmission to the UE (which may be referred to as a single mode, a single TRP, or the like). In this case, TRP 1 transmits both a control signal (PDCCH) and a data signal (PDSCH) to the UE.

Figure 1B:
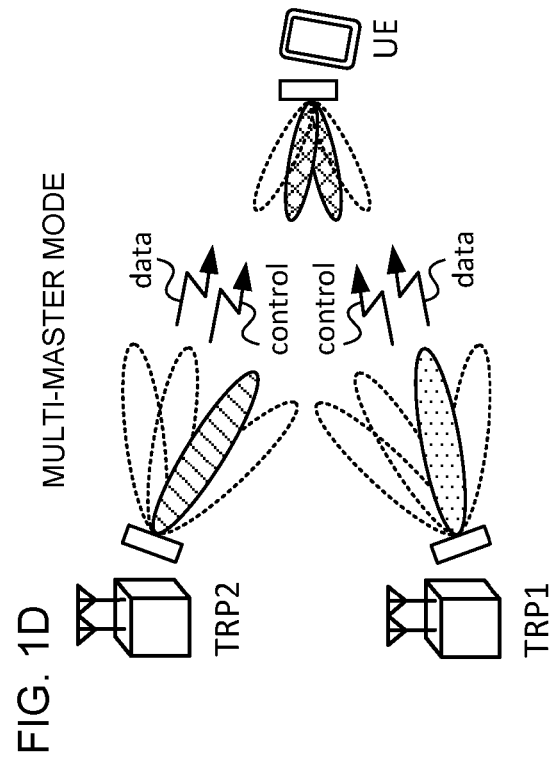

FIG. 1B shows an example of a case in which only one TRP (in the present example, TRP 1) out of the multiple TRPs transmits a control signal to the UE, and each of the multiple TRPs transmits a data signal (which may be referred to as a single master mode). The UE receives each PDSCH transmitted from the multiple TRPs, based on one piece of downlink control information (DCI).

Figure 1C:
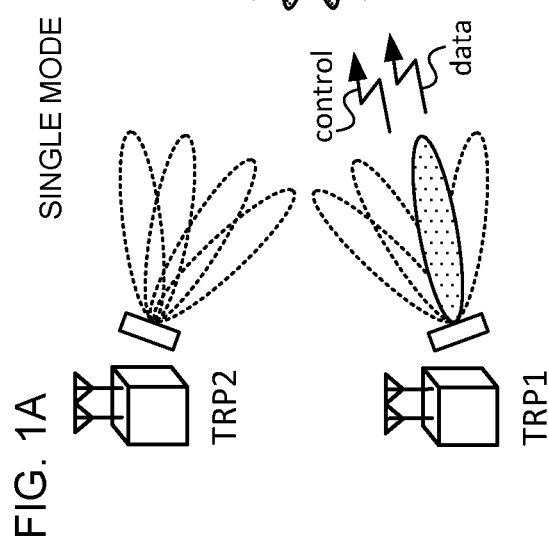

FIG. 1C shows an example of a case in which each of the multi-TRPs transmits a part of a control signal to the UE, and each of the multiple TRPs transmits a data signal (which may be referred to as a master slave mode). In TRP 1, part 1 of the control signal (DCI) may be transmitted, and in TRP 2, part 2 of the control signal (DCI) may be transmitted. Part 2 of the control signal may depend on part 1. The UE receives each PDSCH transmitted from the multiple TRPs, based on these parts of DCI.

Figure 1D:
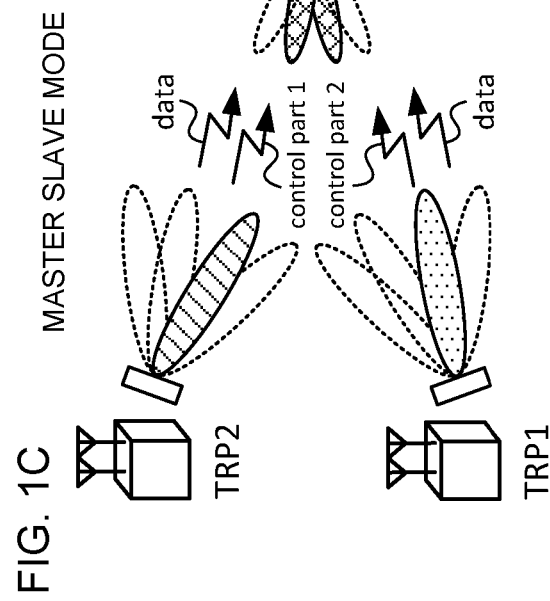

FIG. 1D shows an example of a case in which each of the multiple TRPs transmits separate control signals to the UE, and each of the multiple TRPs transmits a data signal (which may be referred to as a multi-master mode). In TRP 1, a first control signal (DCI) may be transmitted, and in TRP 2, a second control signal (DCI) may be transmitted. The UE receives each PDSCH transmitted from the multiple TRPs, based on these pieces of DCI.

When a plurality of PDSCHs (which may be referred to as multiple PDSCHs) from the multiple TRPs as shown in FIG. 1B are scheduled by using one piece of DCI, the piece of DCI may be referred to as single DCI (single PDCCH). When a plurality of PDSCHs from the multiple TRPs as shown in FIG. 1D are scheduled by using a plurality of respective pieces of DCI, the plurality of pieces of DCI may be referred to as multiple pieces of DCI (multiple PDSCHs (multiple PDSCHs)).

According to the multi-TRP scenario as described above, more flexible transmission control using channels with satisfactory quality can be performed.

From each TRP of the multiple TRPs, a different code word (CW) and a different layer may be transmitted. As one form of the multi-TRP transmission, non-coherent joint transmission (NCJT) has been under study.

In NCJT, for example, TRP 1 performs modulation mapping of the first code word and performs layer mapping so as to transmit the first PDSCH by using first precoding for a first number of layers (for example, two layers). TRP 2 performs modulation mapping of the second code word and performs layer mapping so as to transmit the second PDSCH by using second precoding for a second number of layers (for example, two layers).

Note that it may be defined that the plurality of PDSCHs (multiple PDSCHs) subjected to NCJT partially or entirely overlap regarding at least one of the time and frequency domains. In other words, at least one of time and frequency resources of the first PDSCH from the first TRP and the second PDSCH from the second TRP may overlap.

It may be assumed that these first PDSCH and second PDSCH are not in a relationship of quasi-co-location (QCL) (not quasi-co-located). Reception of the multiple PDSCHs may be interpreted as simultaneous reception of the PDSCHs of a QCL type other than QCL type D.

As in the multi-master mode, in order to support multi-TRP transmission within a cell (intra-cell, having the same cell ID) and between cells (inter-cell, having different cell IDs) based on the plurality of PDCCHs, in RRC configuration information for linking a plurality of PDCCH/PDSCH pairs having a plurality of TRPs, one control resource set (CORESET) in PDCCH configuration information (PDCCH-Config) may correspond to one TRP.

In NR Rel. 15, the maximum number of CORESETs for each piece of PDCCH configuration information is three. In a plurality of TRP operations based on the plurality of PDCCHs, the maximum number of CORESETs for each piece of PDCCH configuration information or BWP may be increased to five according to UE capability.

(QCL/TCI)

In NR, the following scheme has been under study: reception processing (for example, at least one of reception, demapping, demodulation, and decoding) of at least one of a signal and a channel (referred to as "signal/channel") is controlled based on a transmission configuration indication state (TCI state).

Here, the TCI state is information related to quasi-co-location (QCL) of the signal/channel, and may also be referred to as a spatial reception parameter, spatial relation information (spatial relation info), or the like. The TCI state may be configured for the UE for each channel or each signal.

QCL is an indicator indicating statistical properties of the signal/channel. For example, when a given signal/channel and another signal/channel are in a relationship of QCL, it may be indicated that it is assumable that at least one of Doppler shift, a Doppler spread, an average delay, a delay spread, and a spatial parameter (for example, a spatial reception parameter (spatial Rx Parameter)) is the same (the relationship of QCL is satisfied in at least one of these) between such a plurality of different signals/channels.

Note that the spatial reception parameter may correspond to a receive beam of the UE (for example, a receive analog beam), and the beam may be identified based on spatial QCL. The QCL (or at least one element in the relationship of QCL) in the present disclosure may be interpreted as sQCL (spatial QCL).

For the QCL, a plurality of types (QCL types) may be defined. For example, four QCL types A to D may be provided, which have different parameter(s) (or parameter set(s)) that can be assumed to be the same, and such parameter(s) are described below:

QCL type A: Doppler shift, Doppler spread, average delay, and delay spread
    QCL type B: Doppler shift and Doppler spread
    QCL type C: Doppler shift and average delay
    QCL type D: Spatial reception parameter A situation in which the UE assumes that a given CORESET, channel, or reference signal is in a relationship of specific QCL (for example, QCL type D) with another CORESET, channel, or reference signal may be referred to as QCL assumption.

The UE may determine at least one of a transmit beam (Tx beam) and a receive beam (Rx beam) of the signal/channel, based on the TCI state or QCL assumption of the signal/channel.

The TCI state may be, for example, information related to QCL between a channel being a target (or a reference signal (RS) for the channel) and another signal (for example, another downlink reference signal (DL-RS)). The TCI state may be configured (indicated) by higher layer signaling or physical layer signaling, or a combination of these.

In the present disclosure, the higher layer signaling may be, for example, any one of Radio Resource Control (RRC) signaling, Medium Access Control (MAC) signaling, broadcast information, and the like, or a combination of these.

The MAC signaling may use, for example, a MAC control element (MAC CE), a MAC Protocol Data Unit (PDU), or the like. The broadcast information may be, for example, a master information block (MIB), a system information block (SIB), minimum system information (Remaining Minimum System Information (RMSI)), other system information (OSI), or the like.

The physical layer signaling may be, for example, downlink control information (DCI).

A channel for which the TCI state is configured (indicated) may be, for example, at least one of a downlink shared channel (Physical Downlink Shared Channel (PDSCH)), a downlink control channel (Physical Downlink Control Channel (PDCCH)), an uplink shared channel (PUSCH (Physical Uplink Shared Channel)), and an uplink control channel (PUCCH (Physical Uplink Control Channel)).

The RS to have a QCL relationship with the channel may be, for example, at least one of a synchronization signal block (SSB), a channel state information reference signal (CSI-RS), and a reference signal for measurement (Sounding Reference Signal (SRS)).

The SSB is a signal block including at least one of a primary synchronization signal (PSS), a secondary synchronization signal (SSS), and a broadcast channel (Physical Broadcast Channel (PBCH)). The SSB may be referred to as an SS/PBCH block.

An information element ("TCI-state IE" of the RRC) of the TCI state configured by higher layer signaling may include one or a plurality of pieces of QCL information ("QCL-Info"). The QCL information may include at least one of information related to the DL-RS to have a QCL relationship (DL-RS-related information) and information indicating the QCL type (QCL type information). The DL-RS-related information may include information of an index of the DL-RS (for example, an SSB index or a non-zero power CSI-RS resource ID), an index of a cell in which the RS is located, an index of a Bandwidth Part (BWP) in which the RS is located, and the like.

Information related to the QCL between the PDCCH (or a demodulation reference signal (DMRS) antenna port related to the PDCCH) and a given DL-RS may be referred to as a TCI state for the PDCCH or the like.

The UE may determine the TCI state for a UE-specific PDCCH (CORESET), based on higher layer signaling. For example, one or a plurality of (K) TCI states may be configured for the UE for each CORESET by using RRC signaling (ControlResourceSet information element).

The UE may activate each of the one or the plurality of TCI states for each CORESET by using the MAC CE. The MAC CE may be referred to as a TCI state indication MAC CE for UE-specific PDCCH (TCI State Indication for UE-specific PDCCH MAC CE). The UE may perform monitoring of the CORESET, based on an active TCI state corresponding to the CORESET.

(RLM)

Incidentally, in NR as well, radio link monitoring (RLM) is used.

In NR, the base station may configure, for the UE, a radio link monitoring reference signal (Radio Link Monitoring RS (RLM-RS)) for each BWP by using higher layer signaling. The UE may receive configuration information for RLM (for example, a "RadioLinkMonitoringConfig" information element of the RRC).

The configuration information for RLM may include resource configuration information for failure detection (for example, "failureDetectionResourcesToAddModList" of the higher layer parameter). The resource configuration information for failure detection may include a parameter related to the RLM-RS (for example, "RadioLinkMonitoringRS" of the higher layer parameter).

The parameter related to the RLM-RS may include information indicating support of the purpose of RLM, an index corresponding to a resource of the RLM-RS (for example, an index included in "failureDetectionResources" of the higher layer parameter), and the like. For example, the index may be an index of configuration of the CSI-RS resource (for example, a non-zero power CSI-RS resource ID), or may be an SS/PBCH block index (SSB index).

The UE may identify an RLM-RS resource, based on the index corresponding to the resource of the RLM-RS, and perform RLM by using the RLM-RS resource.

When the UE is not provided with RadioLinkMonitoringRS (RLM-RS), and the UE is provided with the TCI state including one or more CSI-RSs for PDCCH reception:

If the active TCI state for PDCCH reception includes only one RS, the UE may use, for RLM, the RS that is provided for the TCI state for the active TCI state for PDCCH reception.

If the active TCI state for PDCCH reception includes two RSs, the UE expects that one RS has QCL type D, the UE uses the RS having QCL type D for RLM, and the UE does not expect that both of the RSs have QCL type D.

The UE need not be required to use an aperiodic or semi-persistent RS for RLM.

For $L_{max}$ (the maximum number of candidates of the SS/PBCH block per half frame)=4, the UE may select $N_{RLM}$ RSs that are provided for the active TCI states for PDCCH reception in the CORESETs associated with search space sets in order from the shortest monitoring period of the search space sets. When one or more CORESETs are associated with the search space sets having the same monitoring period, the UE may determine the order of the CORESETs from the highest CORESET index (ID). The UE may select $N_{RLM}$ RSs, according to the order of the CORESETs.

When the UE is not provided with RadioLinkMonitoringRS, the UE need not expect that more than $N_{RLM}$ RadioLinkMonitoringRSs are used for RLM.

When $L_{max}$ is 4, $N_{RLM}$ may be 2. When $L_{max}$ is 8, $N_{RLM}$ may be 4. When $L_{max}$ is 64, $N_{RLM}$ may be 8.

When the UE is not provided with information (for example, RadiolinkMonitoringRS) of the reference signals (RSs) for RLM, the UE determines the RLM-RSs, based on the TCI state for the PDCCH. It is advisable that the number of RLM-RSs be equal to or less than $N_{RLM}$.

When the UE is not provided with the information of the RS for RLM (when the information of the RS for RLM is not explicitly reported to the UE), the following problems 1 and 2 are conceivable as to how the UE determines the RLM-RS.

<Problem 1>

NR Rel. 15 only defines an RLM-RS determination (narrowing) rule (UE operation) for a case in which $L_{max}$ is 4 when $N_{RLM}$ is 2 and the maximum number of CORESETs is three. In Rel. 16, despite the fact that the maximum number of CORESETs is five, the RLM-RS determination rule for a case of $L_{max}=4$ and $N_{RLM}=2$ and a case of $L_{max}=8$ and $N_{RLM}=4$ is not made clear.

<Problem 2>

In NR Rel. 15, the UE determines the CORESETs including the TCI states used for the RLM-RSs, based on the following two factors.

Monitoring period of the search space associated with the CORESET (in order from the shortest monitoring period)

CORESET ID (in order from the highest CORESET ID if there is more than one CORESET corresponding to the same monitoring period)

However, information related to the TRP is not taken into consideration in RLM-RS determination. It is conceivable that the RLM-RS determined by the UE, based on the rule of NR Rel. 15 either corresponds to only one of the TRPs, or is randomly selected from two TRPs. This may not be reasonable for a plurality of PDSCH transmissions based on the plurality of PDCCHs in the multi-TRP scenario.

Unless the determination method of the RLM-RS is clearly defined, RLM is not appropriately performed, with the result that system performance may be deteriorated.

In the light of this, the inventors of the present invention came up with the idea of as method of determining an RLM-RS when the UE is not provided with any RLM-RS (when no RLM-RS is explicitly configured for the UE by using RRC signaling).

(BFR)

In NR, performing communication by using beamforming has been under study. In order to reduce occurrence of a radio link failure (RLF), the following scheme has been under study: when quality of a specific beam is deteriorated, a procedure of switching to another beam (which may be referred to as beam recovery (BR), beam failure recovery (BFR), L1/L2 (Layer 1/Layer 2) beam recovery, or the like) is performed. Note that the BFR procedure may be simply referred to as BFR.

Note that a beam failure in the present disclosure may be referred to as a link failure.

Figure 2:
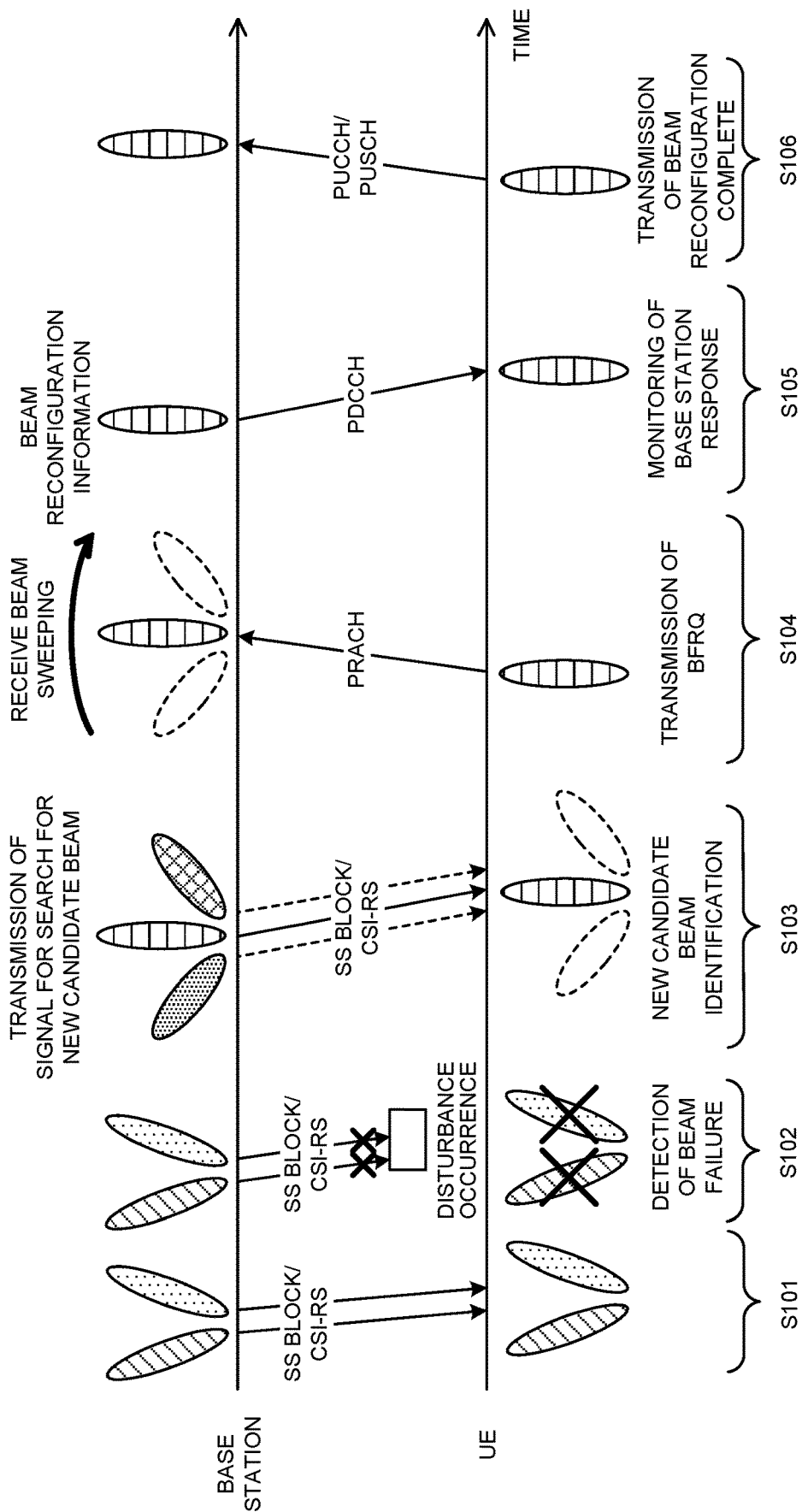
FIG. 2 is a diagram to show an example of a beam recovery procedure in Rel-15 NR.

FIG. 2 is a diagram to show an example of a beam recovery procedure in Rel-15 NR. The number of beams and the like are merely an example, and this is not restrictive.

In the initial state (Step S101) of FIG. 2, the UE performs measurement based on the RS resource transmitted by using two beams. The RS may be at least one of the SSB and the CSI-RS. The RS measured in Step S101 may be referred to as an RS for beam failure detection (Beam Failure Detection RS (BFD-RS)) or the like. The beam failure detection may be simply referred to as failure detection.

In Step S102, the radio wave from the base station is disturbed, and thus the UE cannot detect the BFD-RS (or received quality of the RS is deteriorated). Such disturbance may occur due to an obstruction, fading, interference, or the like between the UE and the base station, for example.

When a given condition is satisfied, the UE detects a beam failure. For example, when a Block Error Rate (BLER) is less than a threshold regarding all of the configured BFD-RSs, the UE may detect occurrence of a beam failure. When occurrence of a beam failure is detected, a lower layer (physical (PHY) layer) of the UE may report (indicate) a beam failure instance to a higher layer (MAC layer).

Note that the criterion of the determination is not limited to the BLER, and may be reference signal received power in the physical layer (Layer 1 Reference Signal Received Power (L1-RSRP)). Note that the RSRP according to the present disclosure may be interpreted as information related to Reference Signal Received Quality (RSRQ), Signal to Interference plus Noise Ratio (SINR), or other power or quality.

Instead of the RS measurement or in addition to the RS measurement, beam failure detection may be performed based on the PDCCH or the like. It may be expected that the BFD-RS is quasi-co-located (QCL) with the DMRS of the PDCCH monitored by the UE.

Information related to the BFD-RS (for example, an index, a resource, a number, the number of ports, precoding, and the like of the RS), information related to beam failure detection (BFD) (for example, the threshold described above), and the like may be configured for (reported to) the UE by using higher layer signaling or the like. The information related to the BFD-RS may be interchangeably interpreted as information related to a resource for BFD, information related to a BFD-RS resource, or the like.

When the MAC layer of the UE receives a beam failure instance report from the PHY layer of the UE, the MAC layer may start a given timer (which may be referred to as a beam failure detection timer). When the MAC layer of the UE receives the beam failure instance report a given number of times (for example, "beamFailureInstanceMaxCount" that is configured in the RRC) or more by the time the timer expires, the MAC layer may trigger the BFR (for example, start any one of random access procedures to be described later).

When the base station receives no report from the UE or when the base station receives a given signal (beam recovery request in Step S104) from the UE, the base station may determine that the UE has detected a beam failure.

In Step S103, for the sake of beam recovery, the UE starts search for a new candidate beam to be used for new communication. The UE may select a new candidate beam corresponding to the RS by measuring a given RS. The RS measured in Step S103 may be referred to as an RS for new candidate beam identification (NCBI-RS (New Candidate Beam Identification RS)), a CBI-RS, a CB-RS (Candidate Beam RS), or the like. The NCBI-RS may be the same as or different from the BFD-RS. Note that the new candidate beam may be simply referred to as a candidate beam.

The UE may determine a beam that satisfies a given condition and corresponds to the RS as the new candidate beam. For example, the UE may determine the new candidate beam, based on the RS whose L1-RSRP exceeds a threshold, out of the configured NCBI-RSs. Note that the criterion of the determination is not limited to the L1-RSRP. The L1-RSRP related to the SSB may be referred to as SS-RSRP. The L1-RSRP related to the CSI-RS may be referred to as CSI-RSRP.

Information related to the NCBI-RS (for example, a resource, a number, the number of ports, precoding, and the like of the RS), information related to new candidate beam identification (NCBI) (for example, the threshold described above), and the like may be configured for (reported) to the UE by using higher layer signaling or the like. The information related to the NCBI-RS may be acquired based on the information related to the BFD-RS. The information related to the NCBI-RS may be referred to as information related to a resource for NCBI or the like.

Note that the BFD-RS, the NCBI-RS, or the like may be interpreted as a radio link monitoring reference signal (RLM-RS (Radio Link Monitoring RS)).

In Step S104, the UE that has identified the new candidate beam transmits a beam recovery request (BFRQ (Beam Failure Recovery reQuest)). The beam recovery request may be referred to as a beam recovery request signal, a beam failure recovery request signal, or the like.

The BFRQ may be, for example, transmitted by using at least one of the PUCCH, the PRACH, the PUSCH, and the configured grant PUSCH. The UE may transmit a preamble (also referred to as an RA preamble, a PRACH, or the like) as the BFRQ by using a PRACH resource.

Information related to correspondence between a detected DL-RS (beam) and a PRACH resource (RA preamble) may be configured for the UE by using higher layer signaling (RRC signaling or the like), for example.

The BFRQ may include information of the new candidate beam that is identified in Step S103. A resource for the BFRQ may be associated with the new candidate beam. Information of the beam may be reported by using a beam index (BI), a port index of a given reference signal, a resource index (for example, a CSI-RS resource indicator (CRI) or an SSB resource indicator (SSBRI)), or the like.

In Step S105, the base station that has detected the BFRQ transmits a response signal (which may be referred to as a gNB response or the like) for the BFRQ from the UE. The response signal may include reconfiguration information (for example, configuration information of a DL-RS resource) regarding one or a plurality of beams. The UE may determine at least one of a transmit beam and a receive beam to be used, based on beam reconfiguration information.

The response signal may be transmitted in a UE common search space of the PDCCH, for example. The response signal may be reported by using DCI (PDCCH) including a cyclic redundancy check (CRC) that is scrambled with an identifier (for example, a cell-radio RNTI (C-RNTI)) of the UE. When the UE receives the PDCCH corresponding to the C-RNTI that is related to the UE itself, the UE may determine that contention resolution has succeeded.

The UE may monitor the response signal, based on at least one of a CORESET for BFR and a search space set for BFR.

Regarding the processing of Step S105, a period for the UE to monitor a response for the BFRQ from the base station (for example, the gNB) may be configured. The period may be referred to as, for example, a gNB response window, a gNB window, a beam recovery request response window, or the like. When there is no gNB response detected in the window period, the UE may perform retransmission of the BFRQ.

In Step S106, the UE may transmit a message indicating that beam reconfiguration has been completed to the base station. For example, the message may be transmitted on the PUCCH, or may be transmitted on the PUSCH.

Beam recovery success (BR success) may indicate a case that the processing has reached Step S106, for example. In contrast, beam recovery failure (BR failure) may correspond to a fact that, for example, the number of times of BFRQ transmission has reached a given number of times, or a beam failure recovery timer (Beam-failure-recovery-Timer) has expired.

Note that the numbers of these steps are merely numbers for the sake of description, and a plurality of steps may be put together, or the order thereof may be changed. Whether or not the BFR is performed may be configured for the UE by using higher layer signaling.

Incidentally, as described above, a scheme in which the beam of CORESET #0 (QCL assumption) is changed in accordance with the PRACH transmitted in the random access procedure has been under study. A scheme in which the beam of CORESET #0 is explicitly configured by using higher layer signaling (for example, RRC signaling or the MAC CE) has also been under study.

A scheme in which CORESET #0 is used not only for initial access but also for unicast PDCCH after RRC connection has been under study. However, to map the unicast PDCCH to CORESET #0, the BFR procedure is required to be performed for the PDCCH of CORESET #0.

In NR, a scheme in which the base station configures a maximum of two resources for BFD per BWP for the UE by using higher layer signaling has been under study. For example, the UE may be provided with resources related to the purpose of the beam failure ("beamFailure") in resource configuration information for failure detection (for example, "failureDetectionResourcesToAddModList," "failureDetectionResources," or the like of the higher layer parameter).

The UE may be provided with a set of indexes corresponding to the resources for BFD by using the higher layer parameter. The set may be, for example, a set of periodic CSI-RS resource configuration indexes (for example, non-zero power CSI-RS resource IDs). The set may be referred to as a set $q_0$ bar (here, "$q_0$ bar" is representation in which an overline is placed over "$q_0$"), an index set, or the like. The set is hereinafter simply referred to as a "set $q_0$."

The UE may detect a beam failure by performing L1-RSRP measurement or the like by using the RS resource corresponding to the index included in the set $q_0$.

Note that, in the present disclosure, to be provided with the above-described higher layer parameter indicating the information of the index corresponding to the resource for BFD may be interchangeably interpreted as to be configured with the resource for BFD, to be configured with the BFD-RS, or the like.

The UE can be provided with the set $q_0$ of periodic CSI-RS resource configuration indexes by using the resources for BFD (for example, failureDetectionResources) with respect to a serving cell, and can be provided with a set $q_1$ bar of periodic CSI-RS resource configuration indexes and/or SS/PBCH block indexes (here, "$q_1$ bar" is representation in which an overline is placed over "$q_1$") by using a candidate beam RS list (for example, candidate-BeamRSList) for radio link quality measurement in the serving cell. The set $q_1$ bar is hereinafter simply referred to as a "set $q_1$."

When the UE is not provided with the resources for BFD, the UE includes, in the set $q_0$, the periodic CSI-RS resource configuration index that has the same value as the RS index in the RS set indicated by the TCI state for each CORESET, and if there are two RS indexes in the TCI state, the UE includes, in the set $q_0$, the RS index that has QCL type D for a corresponding TCI state. The UE expects to include up to two RS indexes in the set $q_0$. The UE expects a single port RS in the set $q_0$.

When the UE is not provided with the resources for BFD (when the resources for BFD are not configured for the UE by using explicit RRC signaling), how many BFD-RSs the UE determines and how the UE determines the BFD-RSs is not made clear. When the UE selects two BFD-RSs, how to select the two BFD-RSs out of three or more CORESETs is not made clear.

In the scenario of the multiple TRPs, whether the BFD-RSs include the RS from only one TRP or panel or include the RSs from two TRPs is not made clear.

Unless the determination method of the BFD-RS is clearly defined, the BFD is not appropriately performed, with the result that system performance may be deteriorated.

In the light of this, the inventors of the present invention came up with the idea of a method of determining a BFD-RS when the UE is not provided with any BFD-RS (when no BFD-RS is explicitly configured for the UE by using RRC signaling).

An embodiment according to the present disclosure will be described in detail below with reference to the drawings. A radio communication method according to each embodiment may be applied individually, or may be applied in combination.

Note that, in the present disclosure, it may be assumed that the UE for which a plurality of TRPs are configured determines at least one of the TRP corresponding to the DCI, the TRP corresponding to the PDSCH or UL transmission (the PUCCH, the PUSCH, the SRS, or the like) scheduled by using the DCI, and the like, based on at least one of the following:

Value of a given field included in the DCI (for example, a field for indicating the TRP, an antenna port field, or a PRI)

DMRS corresponding to the scheduled PDSCH/PUSCH (for example, a sequence, a resource, a CDM group, a DMRS port, a DMRS port group, an antenna port group, and the like of the DMRS)

DMRS corresponding to the PDCCH on which the DCI is transmitted (for example, a sequence, a resource, a CDM group, a DMRS port, a DMRS port group, and the like of the DMRS)

CORESET in which the DCI is received (for example, an ID, a scramble ID (which may be interpreted as a sequence ID), a resource, and the like of the CORESET)

RS used for the TCI state, QCL assumption, the spatial relation information, or the like (RS related group or the like)

In the present disclosure, the single PDCCH (DCI) may be referred to as the PDCCH (DCI) of a first scheduling type (for example, scheduling type A (or type 1)). The multiple PDCCHs (DCI) may be referred to as the PDCCH (DCI) of a second scheduling type (for example, scheduling type B (or type 2)).

In the present disclosure, it may be assumed that the single PDCCH is supported when the multiple TRPs use an ideal backhaul. It may be assumed that the multiple PDCCHs are supported when the multiple TRPs use a non-ideal backhaul therebetween.

Note that the ideal backhaul may be referred to as DMRS port group type 1, reference signal related group type 1, antenna port group type 1, or the like. The non-ideal backhaul may be referred to as DMRS port group type 2, reference signal related group type 2, antenna port group type 2, or the like. The terms are not limited to these.

In the present disclosure, the TRP and the panel may be interchangeably interpreted as each other. The TRP related ID may correspond to at least one of the TRP and the panel. It may be at least one of the TRP related ID, a TRP ID indicating the TRP, a panel ID indicating the panel, a CORESET group ID for the CORESET of the PDCCH from the TRP or the panel, the CORESET ID indicating the CORESET of the PDCCH from the TRP or the panel, and another index corresponding to the TRP or the panel (DMRS port group ID or the like).

(Radio Communication Method)

First Embodiment

When the UE is not provided with any RLM-RS (when no RLM-RS is explicitly configured by using RRC signaling), the UE may select $N_{RLM}$ RLM-RSs, in accordance with an RLM-RS determination rule in NR Rel. 15. In this case, the UE may determine the RS of the TCI state that is associated with at least one TRP as the RLM-RS.

In a manner similar to the RLM-RS determination rule of the case of $L_{max}=4$, the UE may select $N_{RLM}$ RSs corresponding to $L_{max}$ being greater than 4, such as $L_{max}=8$ or $L_{max}=64$.

The RLM-RS determination rule may be one of the following rules 1-1 to 1-4.

<<Rule 1-1>> (Similar to RLM-RS Determination Rule of NR Rel. 15)

The UE may select $N_{RLM}$ RSs that are provided for the active TCI states for PDCCH reception in the CORESETs associated with the search space sets in order from the shortest monitoring period of the search space sets. When more than one CORESET is associated with the search space sets having the same monitoring period, the UE may determine the order of the CORESETs from the highest CORESET index.

<<Rule 1-2>>

The UE may select $N_{RLM}$ RSs that are provided for the active TCI states for PDCCH reception in the CORESETs associated with the search space sets in order from the shortest monitoring period of the search space sets. When more than one CORESET is associated with the search space sets having the same monitoring period, the UE may determine the order of the CORESETs from the lowest CORESET index.

<<Rule 1-3>>

The UE may select $N_{RLM}$ RSs that are provided for the active TCI states for PDCCH reception in the CORESETs associated with the search space sets in order from the longest monitoring period of the search space sets. When more than one CORESET is associated with the search space sets having the same monitoring period, the UE may determine the order of the CORESETs from the highest CORESET index.

<<Rule 1-4>>

The UE may select $N_{RLM}$ RSs that are provided for the active TCI states for PDCCH reception in the CORESETs associated with the search space sets in order from the longest monitoring period of the search space sets. When more than one CORESET is associated with the search space sets having the same monitoring period, the UE may determine the order of the CORESETs from the lowest CORESET index.

In a case of selection in order from the longest monitoring period (rules 1-3 and 1-4), failure can be reduced owing to RLM if failure frequently occurs in the PDCCH having the longest monitoring period.

In a case of selection in order from the lowest CORESET ID (rules 1-2 and 1-4), a specific CORESET, such as CORESET 0, can be preferentially selected.

Figure 3:
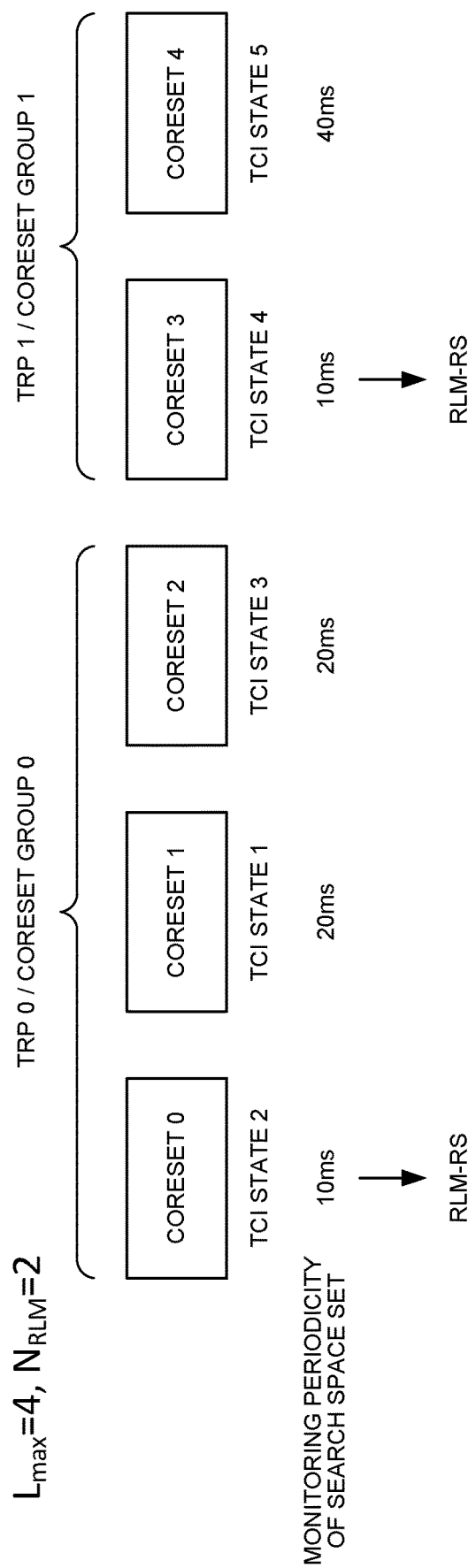
FIG. 3 is a diagram to show an example of an RLM-RS determination rule according to a first embodiment.

In FIG. 3, CORESET group 0 corresponds to TRP 0, and includes CORESETs 0, 1, and 2. CORESET group 1 corresponds to TRP 1, and includes CORESETs 3 and 4. The monitoring periods of the search space sets associated with CORESETs 0, 1, 2, 3, and 4 are 10, 20, 20, 10, and 40 ms, respectively. The TCI states of the PDCCH in CORESETs 0, 1, 2, 3, and 4 are TCI states 2, 1, 3, 4, and 5, respectively.

In this example, $L_{max}$ is 4 and $N_{RLM}$ is 2, and the UE uses rule 1-1.

The UE selects TCI states 2 and 4 for the PDCCH in CORESETs 0 and 3 associated with the search space sets having the shortest monitoring period of 10 ms in order from the monitoring period out of the CORESETs in all of the CORESET groups. Through the operation, the UE determines the RSs of selected TCI states 2 and 4 as $N_{RLM}$ (two) RLM-RSs.

According to the first embodiment described above, the UE can determine the RLM-RS even when $L_{max}$ is 8 and $N_{RLM}$ is 4.

Second Embodiment

The restriction "the active TCI state for PDCCH reception in the CORESET having the lowest or highest TRP related ID is used" may be added to the RLM-RS determination rule according to NR Rel. 15 or the first embodiment.

The PDCCH configuration information (for example, PDCCH-Config) may include CORESET information (for example, controlResourceSet) and search space information (for example, searchSpace). The CORESET information may include a CORESET ID (an index, for example, controlResourceSetId) and a CORESET group ID. The CORESET group ID may be an ID corresponding to at least one of the PDSCH, the code word, the DMRS port group, the panel, and the TRP.

When the UE is not provided with RadioLinkMonitoringRS and the UE is provided with the TCI state including one or more CSI-RSs for the PDCCH in the CORESET having the lowest or highest TRP related ID:
  If the active TCI state for PDCCH reception in the CORESET having the lowest or highest TRP related ID includes only one RS, the UE may use, for RLM, the RS that is provided for the TCI state for the active TCI state for the PDCCH.
  If the active TCI state for PDCCH reception in the CORESET having the lowest or highest TRP related ID includes two RSs, the UE expects that one RS has QCL type D, the UE uses the RS having QCL type D for RLM, and the UE does not expect that both of the RSs have QCL type D.
  The UE need not be required to use an aperiodic or semi-persistent RS for RLM.
  For $L_{max}=4$, the UE may select $N_{RLM}$ RSs that are provided for the active TCI states for PDCCH reception in the CORESETs associated with the search space sets in order from the shortest monitoring period of the search space sets out of the CORESETs having the lowest or highest TRP related ID. When more than one CORESET is associated with the search space sets having the same monitoring period, the UE may determine the order of the CORESETs from the highest CORESET index.

When the UE is not provided with RadioLinkMonitoringRS, the UE need not expect that more than $N_{RLM}$ RadioLinkMonitoringRSs are used for RLM.

Figure 4:
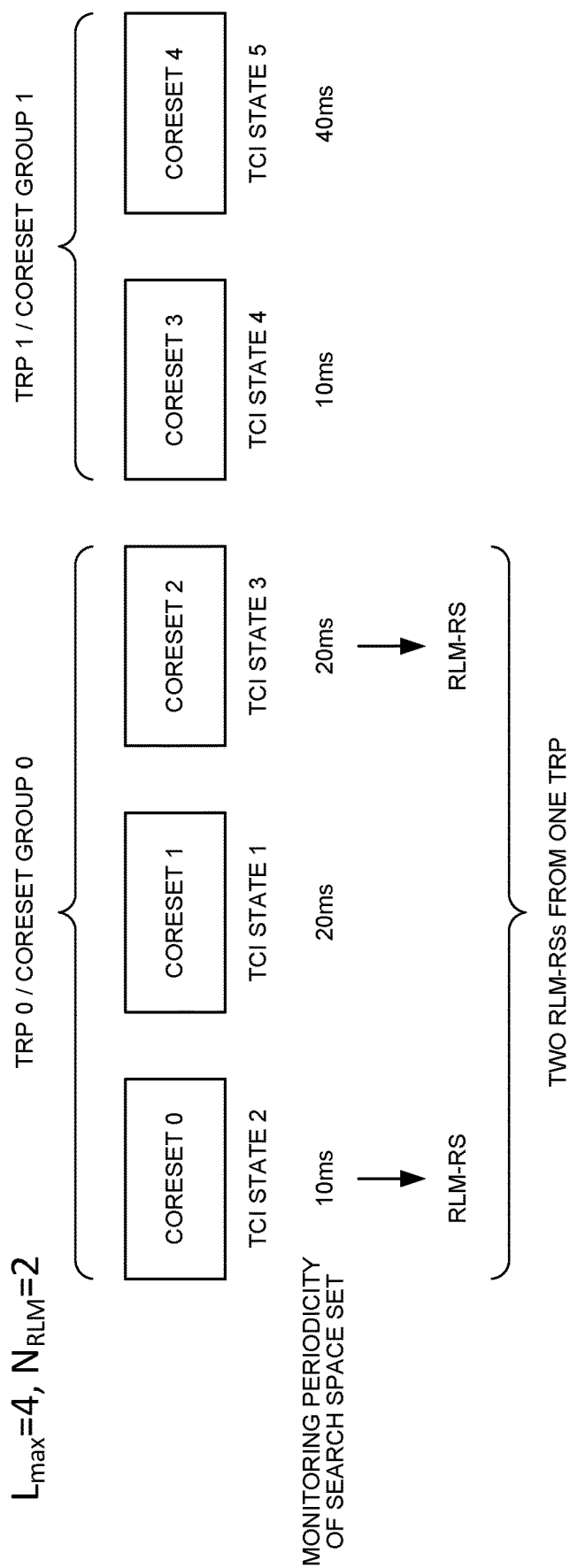
FIG. 4 is a diagram to show an example of an RLM-RS determination rule according to a second embodiment.

In FIG. 4, the TRPs, the CORESET groups, the CORESETs, the monitoring periods of the search space sets, and the configurations of the TCI states are similar to those of FIG. 3.

In this example, $L_{max}$ is 4 and $N_{RLM}$ is 2, and the UE uses rule 1-1.

In this example, it is assumed that the restriction for the RLM-RS determination rule is that "the PDCCH is the PDCCH in the CORESET having the lowest CORESET group ID." In this example, the UE restricts the RLM-RS to the active TCI state for the PDCCH in the CORESET in CORESET group 0 (TRP 0).

The UE selects TCI state 2 for the PDCCH in CORESET 0 associated with the search space set having the shortest monitoring period of 10 ms in order from the monitoring period out of the CORESETs having the lowest CORESET group ID, and selects TCI state 3 for the PDCCH in CORESET 2 having the highest CORESET index out of the two CORESETs associated with the search space sets having the second shortest monitoring period of 20 ms. Through the operation, the UE determines the RSs of TCI states 2 and 3 as two RLM-RSs, out of CORESET group 0 corresponding to one TRP.

In NR Rel. 15, the UE has RRC connection for one TRP, and the RLM-RS is associated only with the TRP. According to the second embodiment, a plurality of RLM-RSs associated with a specific TRP (connected TRP, default TRP) are selected, and thus RLM for the specific TRP can be securely performed.

Third Embodiment

The extension "the UE uses two RSs provided for the respective active TCI states for PDCCH reception in the CORESETs having two TRP related IDs as the RLM-RSs" may be added to the RLM-RS determination rule according to NR Rel. 15 or the first embodiment.

<<Step 1>>

The UE may use at least two RSs as the RLM-RSs, from the active TCI states for PDCCH reception from different TRP related IDs. The UE may select the RLM-RSs by using the RLM-RS determination rule according to NR Rel. 15 or the first embodiment in each TRP related ID.

<<Step 2>>

After the UE determines at least two RLM-RSs from different TRP related IDs, the UE may determine the rest of the RLM-RSs, based on one of the following steps 2-1 and 2-2.

<<Step 2-1>>

The UE may determine the rest of the RLM-RSs, based on the RLM-RS determination rule according to NR Rel. 15 or the first embodiment.

<<Step 2-2>>

The UE may determine the rest of the RLM-RSs in order from the two TRPs or different TRP related IDs. The UE may determine the RLM-RS, based on the RLM-RS determination rule according to NR Rel. 15 or the first embodiment in each TRP related ID.

Figure 5:
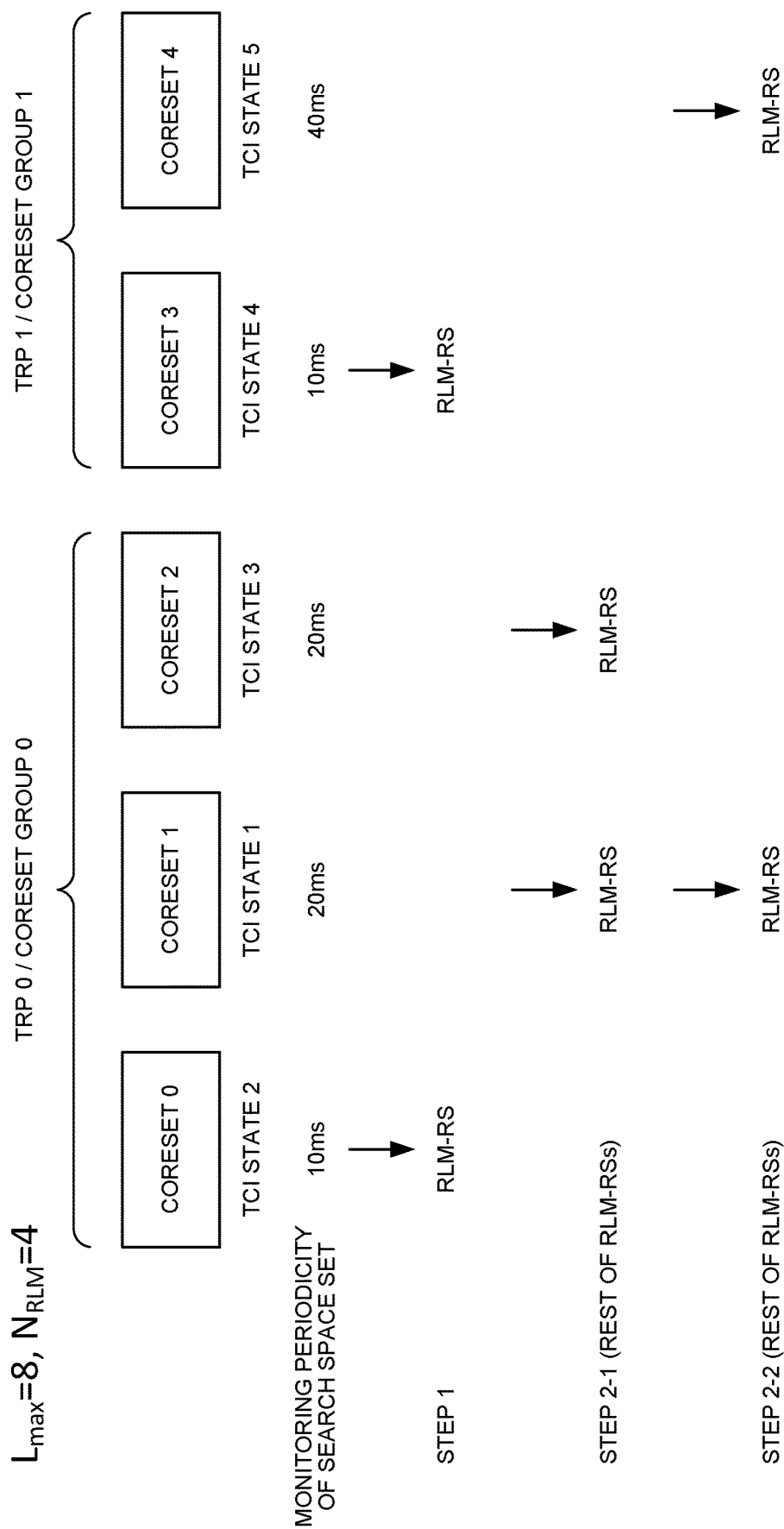
FIG. 5 is a diagram to show an example of an RLM-RS determination rule according to a third embodiment.

In FIG. 5, the TRPs, the CORESET groups, the CORESETs, the monitoring periods of the search space sets, and the configurations of the TCI states are similar to those of FIG. 3.

In this example, $L_{max}$ is 8 and $N_{RLM}$ is 4, and the UE uses rule 1-1.

In step 1, the UE determines the RLM-RSs, based on rule 1-1 from each of different CORESET groups. In this example, the UE selects TCI state 2 for the PDCCH in CORESET 0 associated with the search space set having the shortest monitoring period of 10 ms in CORESET group 0 as the RLM-RS, and selects TCI state 4 for the PDCCH in CORESET 3 associated with the search space set having the shortest monitoring period of 10 ms in CORESET group 1 as the RLM-RS. Through the operation, the UE selects two RLM-RSs out of $N_{RLM}$ (four) RLM-RSs, and selects the other two RLM-RSs in step 2.

When step 2-1 is used, the UE determines the rest of RLM-RSs, based on rule 1-1. In this example, the UE selects TCI states 3 and 1 for the PDCCH in the CORESETs in order from the CORESET having the highest CORESET ID out of CORESETs 1 and 2 associated with the search space sets having the next monitoring period of 20 ms in CORESET group 0 as the RLM-RSs.

When step 2-2 is used, the UE determines the RLM-RSs, based on rule 1-1 from each of different CORESET groups. In this example, the UE selects TCI state 3 for the PDCCH in the CORESET having the highest CORESET ID out of CORESETs 1 and 2 associated with the search space sets having the second shortest monitoring period of 20 ms in CORESET group 0 as the RLM-RS, and selects TCI state 5 for the PDCCH in CORESET 4 associated with the search space set having the second shortest monitoring period of 40 ms in CORESET group 1 as the RLM-RS.

According to the third embodiment described above, when the UE needs to monitor the PDCCH from two TRPs, the UE can securely perform RLM for the two TRPs because the RLM-RSs include the RSs from the two TRPs. For example, when the two TRPs are switched, a radio link with the two TRPs can be maintained.

Fourth Embodiment

The UE may determine the BFD-RS (set $q_0$ of aperiodic CSI-RS resource configuration indexes) by using a BFD determination rule based on the RLM-RS determination rule according to NR Rel. 15 or the first embodiment. In this case, the UE may determine the RS of the TCI state that is associated with at least one TRP as the BFD-RS.

The UE may determine up to Y BFD-RSs, based on the BFD-RS determination rule. Y may be 2, or may be 3 or more.

The BFD-RS determination rule may be one of the following rules 2-1 to 2-4.

<<Rule 2-1>> (Based on Rule 1-1)

The UE may select up to Y RSs that are provided for the active TCI states for PDCCH reception in the CORESETs associated with the search space sets in order from the shortest monitoring period of the search space sets. When more than one CORESET is associated with the search space sets having the same monitoring period, the UE may determine the order of the CORESETs from the highest CORESET index.

<<Rule 2-2>> (Based on Rule 1-2)

The UE may select up to Y RSs that are provided for the active TCI states for PDCCH reception in the CORESETs associated with the search space sets in order from the shortest monitoring period of the search space sets. When one or more CORESETs are associated with the search space sets having the same monitoring period, the UE may determine the order of the CORESETs from the lowest CORESET index.

<<Rule 2-3>> (Based on Rule 1-3)

The UE may select up to Y RSs that are provided for the active TCI states for PDCCH reception in the CORESETs associated with the search space sets in order from the longest monitoring period of the search space sets. When more than one CORESET is associated with the search space sets having the same monitoring period, the UE may determine the order of the CORESETs from the highest CORESET index.

<<Rule 2-4>> (Based on Rule 1-4)

The UE may select up to Y RSs that are provided for the active TCI states for PDCCH reception in the CORESETs associated with the search space sets in order from the longest monitoring period of the search space sets. When more than one CORESET is associated with the search space sets having the same monitoring period, the UE may determine the order of the CORESETs from the lowest CORESET index.

Figure 6:
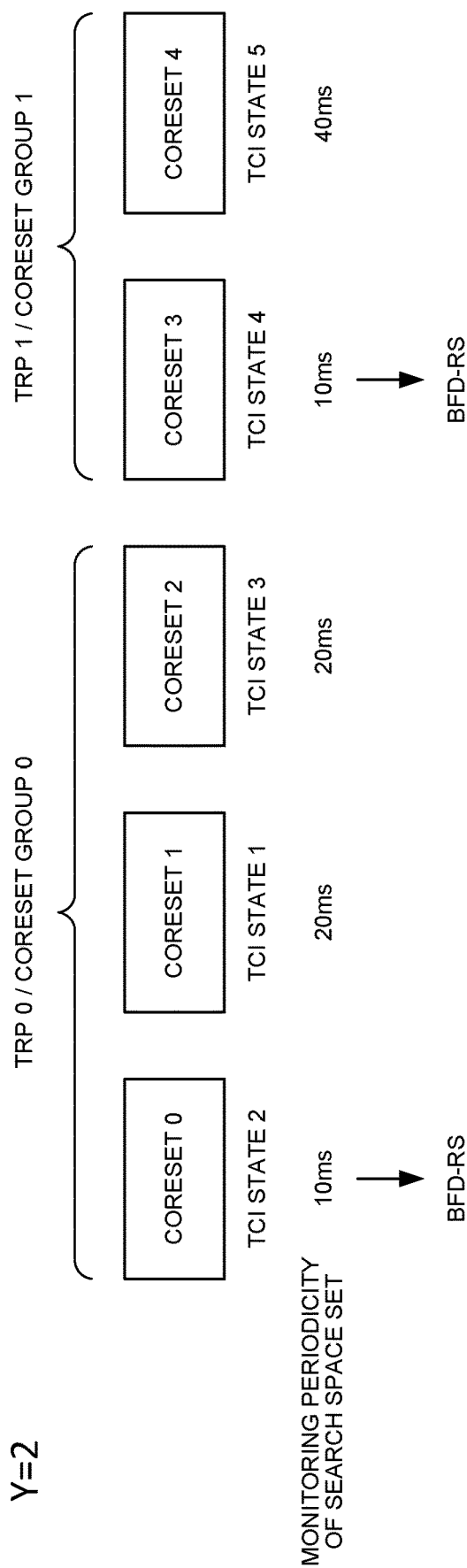
FIG. 6 is a diagram to show an example of a BFD-RS determination rule according to a fourth embodiment.

In FIG. 6, the TRPs, the CORESET groups, the CORESETs, the monitoring periods of the search space sets, and the configurations of the TCI states are similar to those of FIG. 3.

In this example, Y is 2, and the UE uses rule 2-1.

The UE selects TCI states 2 and 4 for the PDCCH in CORESETs 0 and 3 associated with the search space sets having the shortest monitoring period of 10 ms in order from the monitoring period out of the CORESETs in all of the CORESET groups. Through the operation, the UE determines the RSs of selected TCI states 2 and 3 as two BFD-RSs.

The BFD-RS determination rule may use the same order as that of the RLM-RS determination rule in the monitoring period and the CORESET ID. In this case, reliability of the BFD-RS can be enhanced.

The BFD-RS determination rule may use a different order from that of the RLM-RS determination rule in the monitoring period and the CORESET ID. In this case, a state not detected by the RLM-RS may be able to be detected by the BFD-RS.

According to the fourth embodiment described above, the UE can determine the BFD-RS even when the UE is not provided with the BFD-RS.

Fifth Embodiment

The restriction "the active TCI state for PDCCH reception in the CORESET having the lowest or highest TRP related ID is used" may be added to the RLM-RS determination rule according to NR Rel. 15 or the BFD-RS determination rule according to the fourth embodiment.

The UE may select, as the BFD-RSs (set $q_0$), Y RSs that are provided for the active TCI states for PDCCH reception in the CORESETs associated with the search spaces in order from the shortest monitoring period of the search spaces out of the CORESETs having the lowest or highest TRP related ID. If more than one CORESET having the same TRP related ID is associated with the search space sets having the same monitoring period, the UE may determine the order of the CORESETs from the highest or lowest CORESET index having the TRP related ID.

Figure 7:
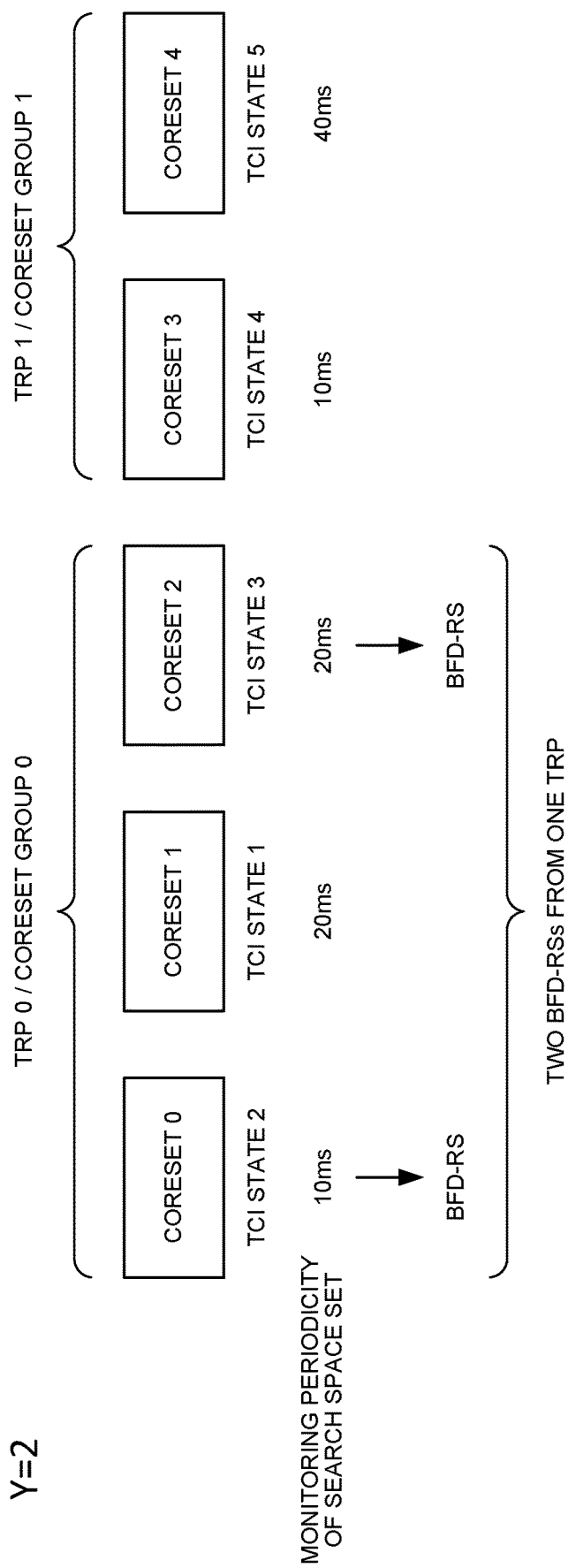
FIG. 7 is a diagram to show an example of a BFD-RS determination rule according to a fifth embodiment.

In FIG. 7, the TRPs, the CORESET groups, the CORESETs, the monitoring periods of the search space sets, and the configurations of the TCI states are similar to those of FIG. 3.

In this example, Y is 2, and the UE uses rule 2-1.

In this example, it is assumed that the restriction for the BFD-RS determination rule is that "the PDCCH is the PDCCH in the CORESET having the lowest CORESET group ID." In this example, the UE restricts the BFD-RS to the active TCI state for the PDCCH in the CORESET in CORESET group 0 (TRP 0).

The UE selects TCI state 2 for the PDCCH in CORESET 0 associated with the search space set having the shortest monitoring period of 10 ms in order from the monitoring period out of the CORESETs having the lowest CORESET group ID, and selects TCI state 3 for the PDCCH in CORESET 2 having the highest CORESET index out of the two CORESETs associated with the search space sets having the second shortest monitoring period of 20 ms. Through the operation, the UE determines the RSs of TCI states 2 and 3 as two BFD-RSs, out of CORESET group 0 corresponding to one TRP.

According to the fifth embodiment, a plurality of BFD-RSs associated with a specific TRP (connected TRP, default TRP) are selected, and thus BFD for the specific TRP can be securely performed.

Sixth Embodiment

The extension "the UE uses Y RSs provided for the active TCI states for PDCCH reception in the CORESETs having two TRP related IDs as the BFD-RSs" may be added to the RLM-RS determination rule according to NR Rel. 15 or the BFD-RS determination rule according to the fourth embodiment. The extension "the UE uses two RSs respectively provided for the active TCI states for PDCCH reception in the CORESETs having two TRP related IDs as the BFD-RSs" may be added to the RLM-RS determination rule according to NR Rel. 15 or the BFD-RS determination rule according to the fourth embodiment.

The UE may select, as the BFD-RSs (set $q_0$), Y RSs that are provided for the active TCI states for PDCCH reception in the CORESETs associated with the search spaces in order from the shortest monitoring period of the search spaces from two respective CORESETs having different TRP related IDs. If more than one CORESET having the same TRP related ID is associated with the search space sets having the same monitoring period, the UE may determine the order of the CORESETs from the highest or lowest CORESET index having the TRP related ID.

Figure 8:
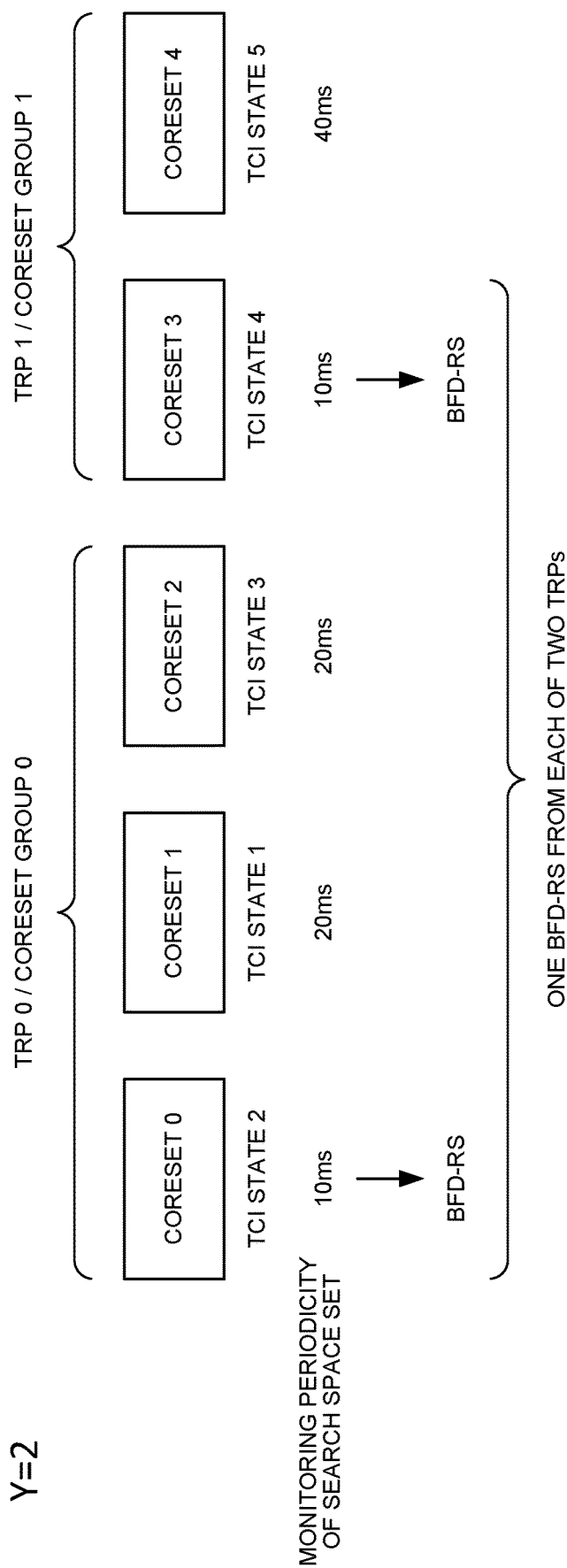
FIG. 8 is a diagram to show an example of a BFD-RS determination rule according to a sixth embodiment.

In FIG. 8, the TRPs, the CORESET groups, the CORESETs, the monitoring periods of the search space sets, and the configurations of the TCI states are similar to those of FIG. 3.

In this example, Y is 2, and the UE uses rule 2-1.

The UE determines the RLM-RSs, based on rule 2-1 from each of different CORESET groups. In this example, the UE selects TCI state 2 for the PDCCH in CORESET 0 associated with the search space set having the shortest monitoring period of 10 ms in CORESET group 0 as the BFD-RS, and selects TCI state 4 for the PDCCH in CORESET 3 associated with the search space set having the shortest monitoring period of 10 ms in CORESET group 1 as the BFD-RS. Through the operation, the UE determines TCI states 2 and 4 as the BFD-RSs.

According to the sixth embodiment described above, when the UE needs to monitor the PDCCH from two TRPs, the UE can securely perform BFD for the two TRPs because the BFD-RSs include the RSs from the two TRPs. For example, when the two TRPs are switched, beams with the two TRPs can be maintained.

Seventh Embodiment

When the UE is provided with the BFD-RS, the UE may be provided with up to X BFD-RSs (set $q_0$). When the UE is not provided with the BFD-RS, the UE may determine up to Y BFD-RSs in accordance with one of the fourth to sixth embodiments. Y may be X, or may be X+1. X may be 2, or may be 3 or more.

With this configuration, the UE can determine an appropriate number of BFD-RSs even when the BFD-RS is not configured for the UE.

Eighth Embodiment

The UE may report, to the network, UE capability information (UE capability) including information related to at least one of the following:
- Whether or not simultaneous reception of a plurality of pieces of DCI (multiple pieces of DCI, multiple PDCCHs) is supported (for example, whether or not detection of two or more DCI formats of a plurality of PDCCHs received in the same slot with the first symbol being the same symbol is permitted)
- Whether or not simultaneous reception of a plurality of pieces of DCI not in a specific QCL relationship (for example, not having QCL type D) is supported
- Whether or not NCJT of the PDCCHs (in other words, simultaneous reception of a plurality of PDCCHs (code words) not in a specific QCL relationship (for example, not having QCL type D)) is supported
- Whether or not the single DCI is supported
- Whether or not the multiple pieces of DCI are supported
- Number of pieces of DCI that can be detected (or decoded) by the UE in a given PDCCH monitoring period or the same symbol (for example, the OFDM symbol)
- Number of pieces of DCI not in a specific QCL relationship (for example, not having QCL type D) that can be detected (or decoded) by the UE in a given PDCCH monitoring period or the same symbol (for example, the OFDM symbol)
- Number of PDCCHs (or code words) that can be detected (or decoded) by the UE in the same symbol (for example, the OFDM symbol)
- Number of PDCCHs (or code words) not in a specific QCL relationship (for example, not having QCL type D) that can be detected (or decoded) by the UE in the same symbol (for example, the OFDM symbol)
- Number or a maximum number of RLM-RSs selected by the UE when the RLM-RS is not provided
- Number or a maximum number of BFD-RSs selected by the UE when the BFD-RS is not provided When the UE reports at least one of the above-described UE capabilities, the UE may assume that the UE applies (or is configured to apply) at least one of the embodiments described above. The network may report information for enabling operation based on at least one of the embodiments described above to the UE that has reported at least one of the above-described UE capabilities.

Note that such operation may be applied only to a given frequency range (for example, Frequency Range 2 (FR 2)). Owing to such operation, complexity of the UE can be reduced.

OTHER EMBODIMENTS

In each of the embodiments described above, at least any of the following may be applied.

The UE may assume that the number $N_{RLM}$ of RLM-RSs is not larger than the number of CORESETs.

When $N_{RLM}$ is larger than the number of CORESETs, the UE may determine up to as many RLM-RSs as the number of active TCI states by using the number of active TCI states instead of $N_{RLM}$ (number of TCI states activated by the MAC CE). It is conceivable that the number of active TCI states is larger than the number of CORESETs.

The UE may assume that the number Y of BFD-RSs is not larger than the number of CORESETs.

When the number of CORESETs is larger than Y, the UE may determine the BFD-RSs up to the number of active TCI states by using the number of active TCI states instead of Y.

The UE may use different RLM-RS determination rules between a case of using the single TRP and a case of using the multiple TRPs.

The UE may use different BFD-RS determination rules between a case of using the single TRP and a case of using the multiple TRPs.

The UE may change at least one of the RLM-RS determination rule and the RLM-RS determination rule, based on at least one of the RRC signaling, the MAC CE, and the DCI. For example, at least one of the RLM-RS determination rule and the BFD-RS determination rule may be different between a case in which at least one of the following conditions is satisfied and a case in which none of the conditions is satisfied: a case in which the DCI for scheduling the PDSCH is received, a case in which the PDSCHs from the plurality of TRPs are simultaneously received, and a case in which the UE has the TCI state for each TRP.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 9:
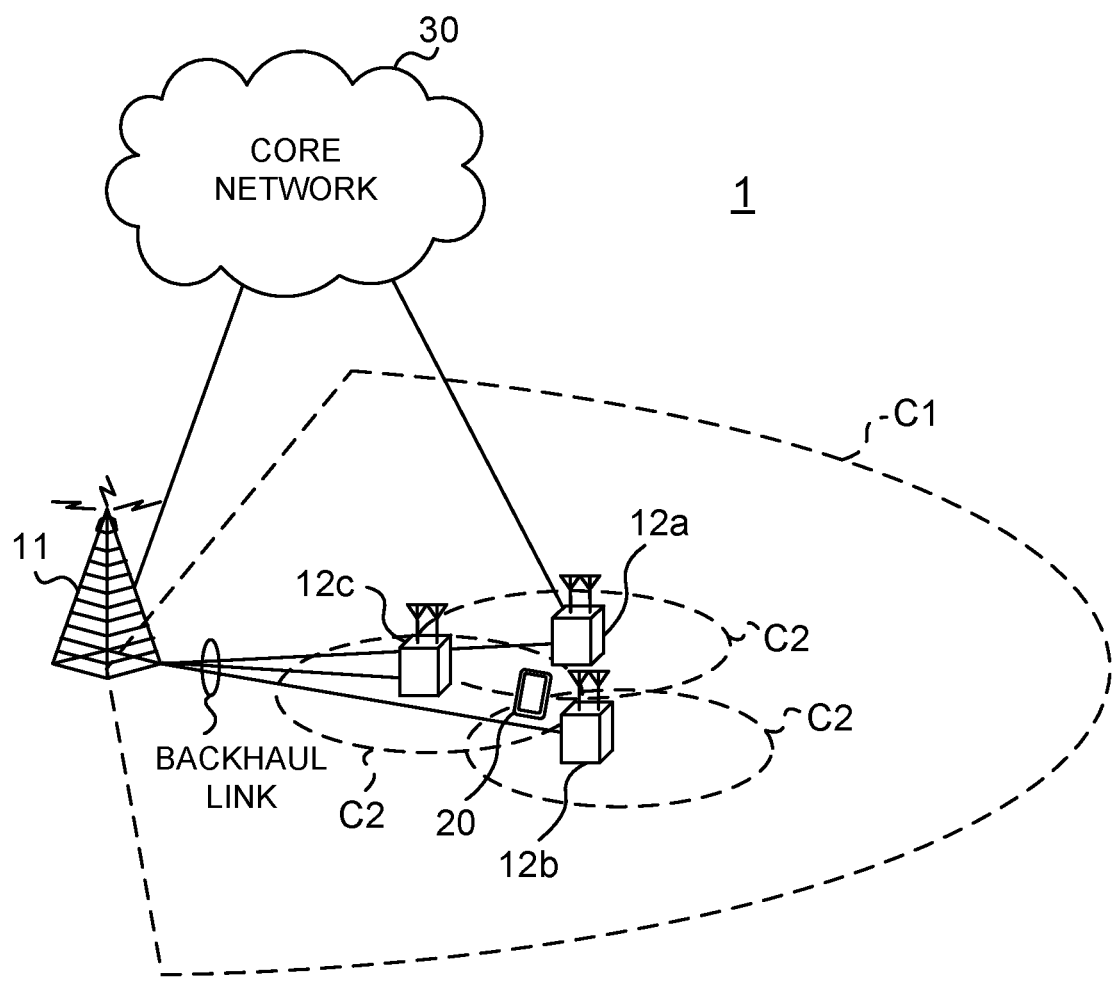
FIG. 9 is a diagram to show an example of a schematic structure of a radio communication system according to one embodiment.

FIG. 9 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data," and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 10:
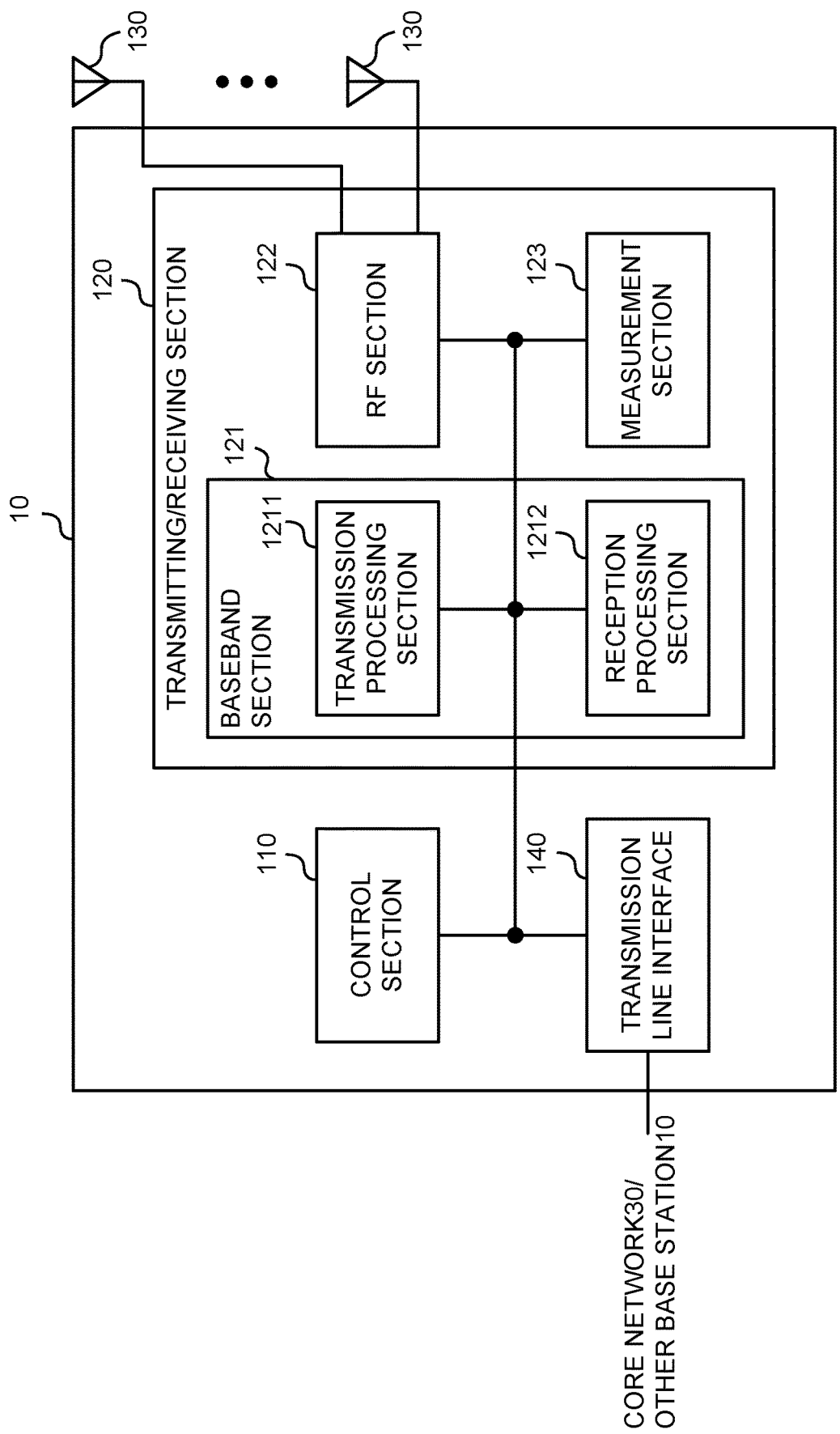
FIG. 10 is a diagram to show an example of a structure of a base station according to one embodiment.

FIG. 10 is a diagram to show an example of a structure of the base station according to one embodiment. The base station 10 includes a control section 110, a transmitting/receiving section 120, transmitting/receiving antennas 130 and a transmission line interface 140. Note that the base station 10 may include one or more control sections 110, one or more transmitting/receiving sections 120, one or more transmitting/receiving antennas 130, and one or more transmission line interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the transmission line interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmit beam and a receive beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The transmission line interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the transmission line interface 140.

Note that the transmitting/receiving section 120 may transmit a reference signal (for example, the SSB, the CSI-RS, or the like). The transmitting/receiving section 120 may transmit information (the MAC CE or the DCI) for indicating a TCI state for a specific DL channel. The TCI state may indicate at least one of a reference signal (for example, the SSB, the CSI-RS, or the like), a QCL type, and a cell in which the reference signal is transmitted. The TCI state may indicate one or more reference signals. The one or more reference signals may include a reference signal of QCL type A, or may include a reference signal of QCL type D.

(User Terminal)

Figure 11:
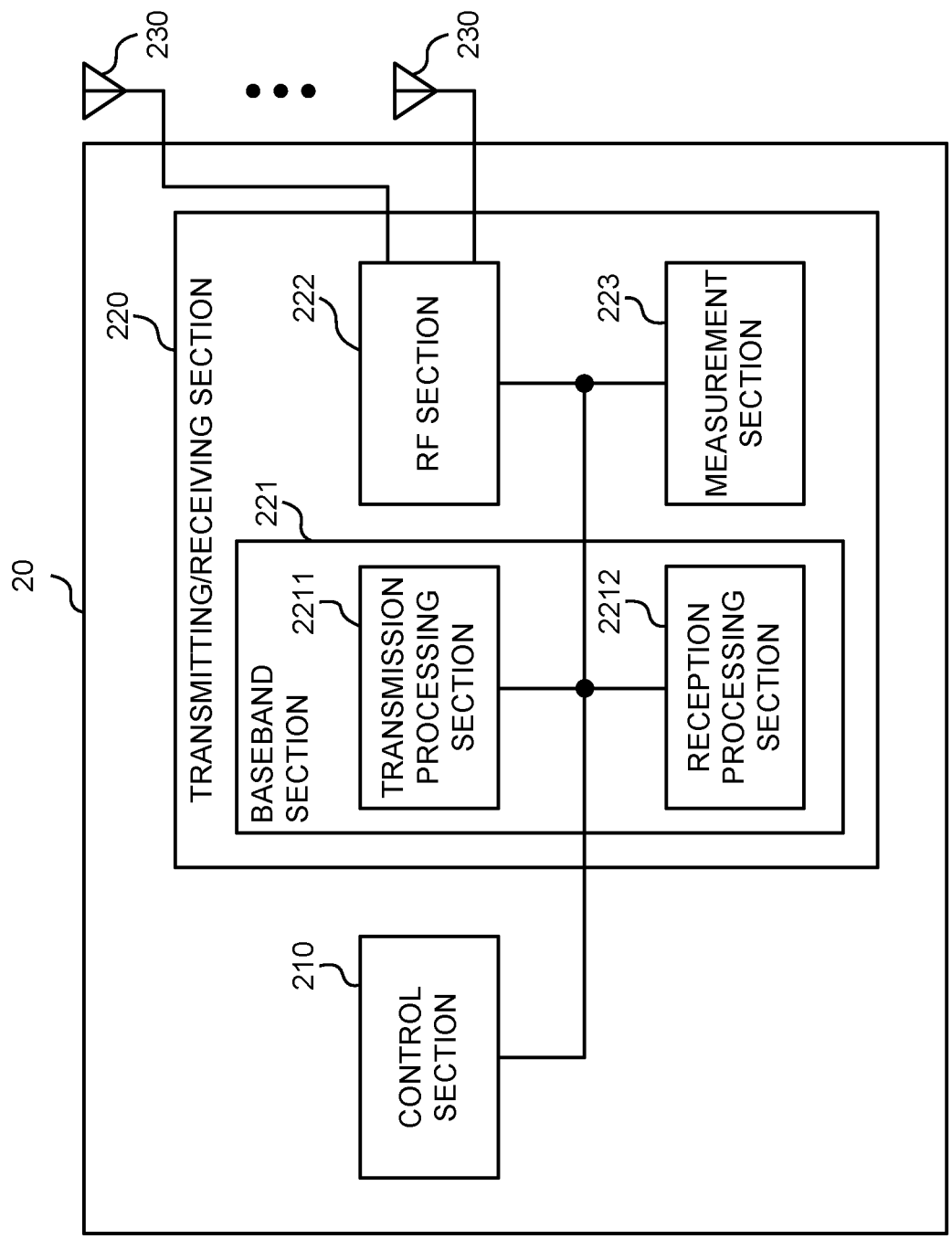
FIG. 11 is a diagram to show an example of a structure of a user terminal according to one embodiment.

FIG. 11 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmit beam and a receive beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a reference signal (for example, the SSB, the CSI-RS, or the like).

When a reference signal for radio link monitoring (RLM-RS) is not configured for the user terminal 20, the control section 210 may determine a reference signal of a transmission configuration indication (TCI) state associated with at least one transmission/reception point (TRP) as the RLM-RS. The transmitting/receiving section 220 may receive the RLM-RS.

The control section 210 may select a control resource set (CORESET) associated with the at least one TRP according to descending order or ascending order of a monitoring period of a search space set associated with the CORESET associated with the at least one TRP and descending order or ascending order of a CORESET ID associated with the at least one TRP, and determine the reference signal of an active TCI state for physical downlink control channel (PDCCH) reception in the selected CORESET as the RLM-RS (first embodiment).

The CORESET may be the CORESET associated with a lowest value or a highest value of an index related to the TRP (second embodiment).

The control section 210 may include the reference signal of the TCI state associated with each of a plurality of TRPs in the RLM-RS, and include the reference signal of the active TCI state associated with at least one of the plurality of TRPs in the RLM-RS (third embodiment).

The number of the RLM-RSs may be larger than four (first embodiment).

When a reference signal for beam failure detection (BFD-RS) is not configured for the terminal, the control section 210 may determine a reference signal of a transmission configuration indication (TCI) state associated with at least one transmission/reception point (TRP) as the BFD-RS. The transmitting/receiving section 220 may receive the BFD-RS.

The control section 210 may select a control resource set (CORESET) associated with the at least one TRP according to descending order or ascending order of a monitoring period of a search space set associated with the CORESET associated with the at least one TRP and descending order or ascending order of a CORESET ID associated with the at least one TRP, and determine the reference signal of an active TCI state for physical downlink control channel (PDCCH) reception in the selected CORESET as the BFD-RS (fourth embodiment).

The CORESET may be the CORESET associated with a lowest value or a highest value of an index related to the TRP (fifth embodiment).

The control section 210 may include the reference signal of the TCI state associated with each of a plurality of TRPs in the BFD-RS, and include the reference signal of the TCI state associated with at least one of the plurality of TRPs in the BFD-RS (sixth embodiment).

The number of the BFD-RSs may be equal to the number of the BFD-RSs when the BFD-RS is configured for the terminal, or may be the number obtained by adding 1 to the number of the BFD-RSs when the BFD-RS is configured for the terminal (other embodiments).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 12:
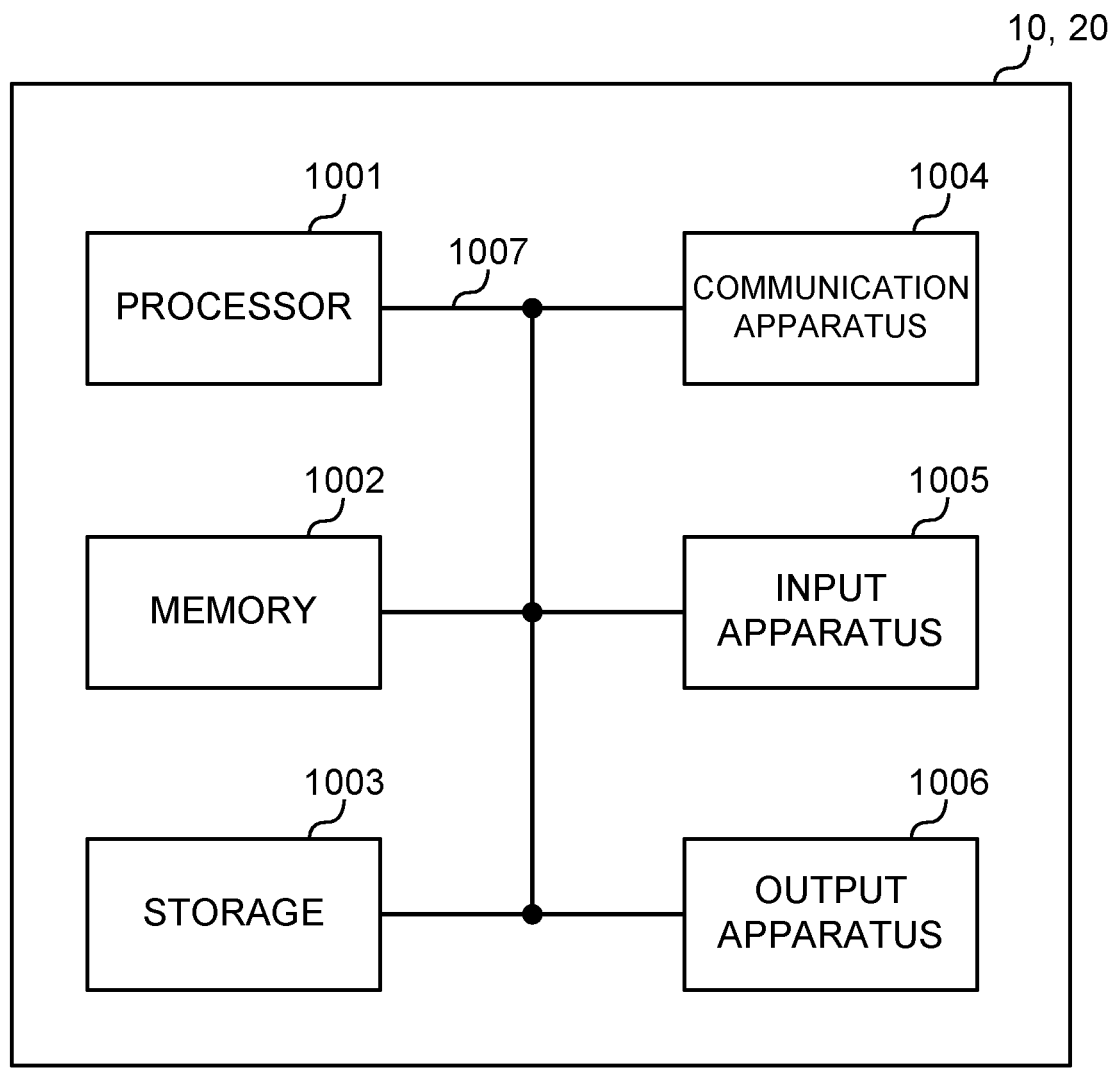
FIG. 12 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 12 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

VARIATIONS

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a processor that, when a reference signal used for beam failure detection is not configured for the terminal, determines a first control resource set (CORESET), from among a first plurality of CORESETs having a first transmission/reception point (TRP) related ID, according to an ascending order of a monitoring period of search space sets associated with the first plurality of CORESETs and a descending order of an ID of the first plurality of CORESETs, and a second CORESET, from among a second plurality of CORESETs having a second TRP related ID, according to an ascending order of a monitoring period of search space sets associated with the second plurality of CORESETs and a descending order of an ID of the second plurality of CORESETs, and determines a first reference signal used for the beam failure detection from reference signals of an active transmission configuration indication (TCI) state for a physical downlink control channel (PDCCH) reception in the determined first CORESET, and a second reference signal used for the beam failure detection from reference signals of an active TCI state for a PDCCH reception in the determined second CORESET; and
a receiver that receives the first reference signal and the second reference signal.

2. A radio communication method for a terminal, comprising:
when a reference signal used for beam failure detection is not configured for the terminal, determining a first control resource set (CORESET), from among a first plurality of CORESETs having a first transmission/reception point (TRP) related ID, according to an ascending order of a monitoring period of search space sets associated with the first plurality of CORESETs and a descending order of an ID of the first plurality of CORESETs, and a second CORESET, from among a second plurality of CORESETs having a second TRP related ID, according to an ascending order of a monitoring period of search space sets associated with the second plurality of CORESETs and a descending order of an ID of the second plurality of CORESETs, and
determining a first reference signal used for the beam failure detection from reference signals of an active transmission configuration indication (TCI) state for a physical downlink control channel (PDCCH) reception in the determined first CORESET, and a second reference signal used for the beam failure detection from reference signals of an active TCI state for a PDCCH reception in the determined second CORESET; and
receiving the first reference signal and the second reference signal.

3. A system comprising a terminal and a base station, wherein
the terminal comprises:
a processor that, when a reference signal used for beam failure detection is not configured for the terminal, determines a first control resource set (CORESET), from among a first plurality of CORESETs having a first transmission/reception point (TRP) related ID, according to an ascending order of a monitoring period of search space sets associated with the first plurality of CORESETs and a descending order of an ID of the first plurality of CORESETs, and a second CORESET, from among a second plurality of CORESETs having a second TRP related ID, according to an ascending order of a monitoring period of search space sets associated with the second plurality of CORESETs and a descending order of an ID of the second plurality of CORESETs, and determines a first reference signal used for the beam failure detection from reference signals of an active transmission configuration indication (TCI) state for a physical downlink control channel (PDCCH) reception in the determined first CORESET, and a second reference signal used for the beam failure detection from reference signals of an active TCI state for a PDCCH reception in the determined second CORESET; and
a receiver that receives the first reference signal and the second reference signal, and
the base station comprises:
a transmitter that transmits the first reference signal and the second reference signal.

* * * * *